United States Patent [19]

Ebersole

[11] 3,841,733
[45] Oct. 15, 1974

[54] OPTICAL WAVEGUIDE SYSTEM FOR PRODUCING A LINE OF MODULATED RADIATION DATA

[75] Inventor: John F. Ebersole, Bedford, Mass.
[73] Assignee: Itek Corporation, Lexington, Mass.
[22] Filed: Dec. 5, 1973
[21] Appl. No.: 421,876

[52] U.S. Cl. ...... 350/160 R, 179/100.3 F, 346/76 L, 346/108, 350/96 WG, 343/754
[51] Int. Cl. ........................... G02f 1/36, G01d 9/42
[58] Field of Search ................. 350/96 WG, 160 R; 346/76 L, 108

[56] References Cited
UNITED STATES PATENTS
3,614,198   10/1971   Martin et al. ................. 350/96 WG

*Primary Examiner*—Herman Karl Saalbach
*Assistant Examiner*—Darwin R. Hostetter
*Attorney, Agent, or Firm*—Homer O. Blair; Robert L. Nathans; William C. Roch

[57] ABSTRACT

A laser image recorder constructed while utilizing integrated optics techniques. In the preferred embodiment, a grating coupler on top of a glass waveguide diffracts a laser beam into the waveguide. An aspheric diverging lens in the waveguide diverges the laser beam across the full width of the waveguide. An aspheric collimating lens positioned across the full width of the waveguide collimates the beam and directs equal intensity radiation into a large number of equally spaced, parallel, electro-optical modulators. Voltages are selectively applied to each of the electro-optical modulators to produce at the output of the modulators an intensity modulated line of light. A film is positioned adjacent to the output of the modulators and records the line. The film is transported in a direction perpendicular to the line and a second line is recorded, etc.

In a second embodiment light is coupled into the waveguide by means of a prism-film coupler. In a third embodiment the laser beam is focused onto the end of the waveguide. A fourth embodiment utilizes a cylindrical lens system to focus a line image of the laser beam directly onto the electro-optical modulators.

Another embodiment illustrates a color recorder wherein three separate line recorders, as described above, are placed adjacent to each other, with a first recorder utilizing a red laser beam, a second recorder utilizing a yellow laser beam, and a third recorder utilizing a blue laser beam.

18 Claims, 4 Drawing Figures

PATENTED OCT 15 1974　　　　　　　　　3,841,733

OPTICAL WAVEGUIDE SYSTEM FOR PRODUCING A LINE OF MODULATED RADIATION DATA

BACKGROUND OF THE INVENTION

The present invention relates generally to a system for displaying or recording light patterns. More particularly the present invention pertains to a new and improved integrated optics, laser image recorder. In the field of laser image recorders, it has been the general practice to utilize a mechanical scanning system to scan a laser beam in a line over a photographic medium. As the line is scanned over the medium, its intensity is modulated via an appropriate optical modulator. The photographic medium is transported, either continuously or incrementally, and a second line is recorded closely adjacent to the first line, and so forth. The plurality of modulated lines are recorded on the photographic medium to produce an output picture. A typical mechanical laser recorder utilizes a multifaceted mirror which is rotated at an extremely high speed to scan the laser beam across the width of the film. In these mechanical recorders, the mirror must be rotated at an extremely high speed, and it must be constructed using state-of-the-art techniques to achieve the required optical tolerances. It would be desirable to have a non-mechanical laser image recorder.

SUMMARY OF THE INVENTION

In accordance with a preferred embodiment a non-mechanical laser image system is disclosed which utilizes integrated optics in its design. The system is extremely compact, and has no moving parts. In one embodiment wherein the system is utilized as part of a recorder (also known as a scanner) the only moving parts are in the film transport. With that embodiment and utilizing 8 inch wide film, the recorder, excluding the film transport section and laser, need be no larger than an 8 inch square package. Further, the preferred embodiment provides such a system in which many bits of information, which form an intensity modulated line pattern, are displayed in parallel rather than in sequence. Also, the recorder of the preferred embodiment may be interfaced easily with computers. The slowest part of a computer system is generally not the computer itself but rather the input-output interfaces to the computer, the present invention may be easily interfaced with a computer as the computer may output serially all information in a line, and the recorder may then record it in parallel. Further, the preferred embodiment provides an integrated optics laser beam recorder which could be manufactured at a very reasonable price.

DESCRIPTION OF PREFERRED EMBODIMENTS

Figure 1:
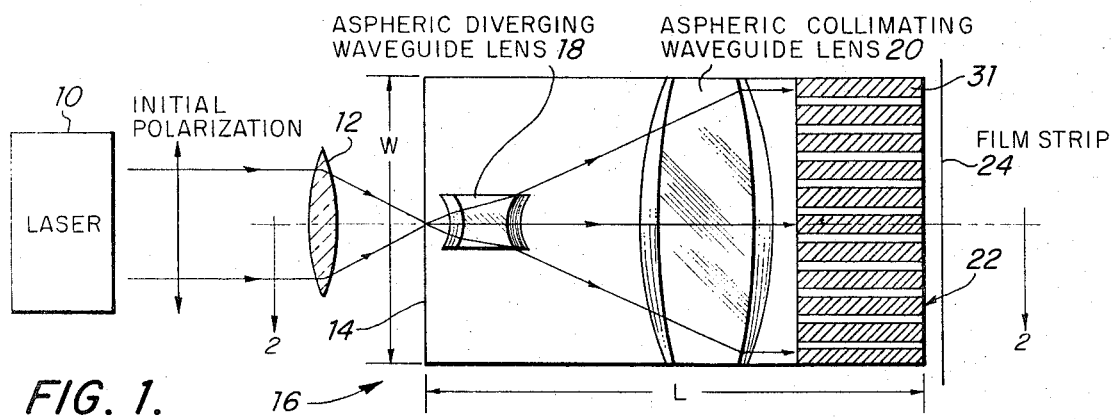
FIGS. 1 and 2 illustrate respectively a top view and a side cross sectional view of one embodiment of an integrated optics system for displaying and recording a line of information.
Figure 2:
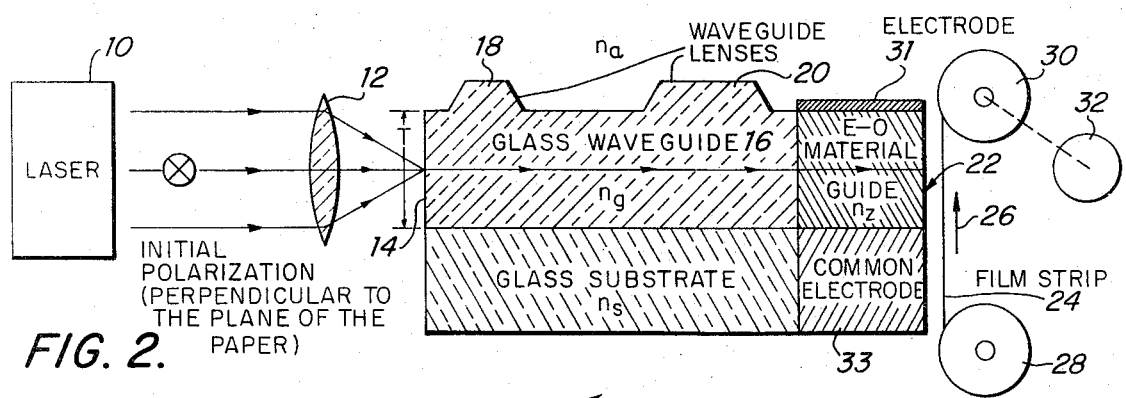

FIGS. 1 and 2 illustrate respectively a top view and a side cross sectional view of one embodiment of applicant's invention. Referring to FIGS. 1 and 2, a laser 10 directs a laser beam to a converging lens system 12 which focuses the laser beam to a point for entry into the end face 14 of a glass waveguide 16. FIGS. 1 and 2, and particularly FIG. 2, have exaggerated dimensions to illustrate the principle of operation of applicant's invention. In practice, the thickness T of the waveguide 14 would be only several microns. After the laser beam enters the waveguide it is directed against a diverging waveguide lens 18. The lens 18 diverges the laser beam across the full width of the waveguide to a second waveguide lens 20 which is a collimating lens and functions to recollimate the beam. Lenses 18 and 20 are aspheric lenses and both are designed to direct radiation of substantial equal intensity across the width of the waveguide at the output of the second lens. The design of waveguide lenses is well known in the art and is discussed in J. Opt. Soc. Am. 61, 154 (1971) R. Shubert and J. Harris, "Optical Guided Wave Focusing and Diffraction." The equal intensity radiation at the output of lens 20 is then directed into a second portion of the waveguide which includes a large number of electro-optic modulators spaced across the width W of the waveguide. The radiation intensity is individually modulated in each of the electro-optic modulators 22, and the output of the modulators is a line across the width of the waveguide which is intensity modulated in accordance with the electrical signals applied to the modulators. This line of information is recorded on a film strip 24. After recordation of a line of information, the film strip 24 is transported in the direction 26, and it is then set for recordation of a second line of information. As is known in the laser image recording arts, a plurality of lines of information are exposed on the film strip to form a resultant image. The design of equipment for moving the film past the exposing end of the waveguide is known in the laser image recording art and will not be discussed in detail here. However, it is illustrated schematically in FIG. 2 as consisting of a roll of unexposed film 28, a roll of exposed film 30, and a transporting motor 32 for moving the film in the direction of arrow 26.

The illustrated embodiment shows the film 24 as being immediately adjacent to the end of the waveguide. With this embodiment, the position of the film must be held within close tolerances relative to the waveguide. In an alternative embodiment, a relay lens system might be utilized to form an image of the line of modulated information at an image plane of the relay lens system. In this embodiment, the film would be positioned in the image plane of the relay lens system instead of immediately adjacent to the end of the waveguide.

The width W of the waveguide would depend upon the width of the film being recorded. If 35 millimeter film were being recorded, the width W would have to be approximately 35 millimeters wide. The number of electro-optic modulators across such a width might be typically 3,500. For 8 inch wide film, the number of electro-optic modulators might be typically 20,000.

Each of the electro-optic modulators operates in the following fashion. The laser beam which is introduced into the waveguide is TE polarized radiation. TE polarized radiation is radiation having its electrical vector (E) positioned in the plane of the waveguide and transverse (T) to the direction of propagation of radiation down the waveguide. A second type of radiation is TM radiation which has its magnetic vector (M) positioned in the plane of the waveguide and transverse to the direction of propagation of radiation down the waveguide. The electrical and magnetic vectors of radiation are perpendicular to each other, and radiation travelling down the waveguide will be either TE or TM, or some proportion of each. Each electro-optic modulator has a separate electrode 31 on the top of the waveguide. A common electrode 33 extends across the width at the bottom of the waveguide. An electric field may be selectively applied across each electro-optic modulator by selectively applying a voltage to the top electrode 31. In one embodiment the electrodes 31 have a length of approximately one centimeter and are formed of a metal such as aluminum. Aluminum and other metals have the characteristic of strongly absorbing TM radiation travelling down the waveguide and not significantly absorbing TE radiation travelling down the waveguide. This phenomena is similar to filtering with a polarizer filter, and is discussed in detail by Y. Suematsu, et al., Appl. Phys. Lett. 21, 291 (1972), "Fundamental Transverse Electric Field ($TE_0$) Mode Selection for Thin-Film Asymmetric Light Guides." In a second embodiment one of the electrodes may be separated from the waveguide by a dielectric insulating layer as discussed by J. N. Polky and G. L. Mitchell, J. Opt. Soc. Am. 63, 478A (1973), "Absorption Phenomena of a Four-Layer Metal-Dielectric Wave Guide Structure." This approach results in resonant absorption of TM radiation and increased transmission of TE radiation. The electro-optic material in the modulator may be any known electro-optical material such as zinc sulfide or lithium niobate or may be a graded composition of electro-optic materials such as zinc sulfide and zinc selenide. Since the laser beam is TE radiation, that radiation normally passes through the electro-optic modulators with minimal absorption. However, if an electrical field is applied across an electro-optic modulator, then it has the effect of rotating the polarization of the radiation, and TE polarized light is rotated to TM polarized light. As the polarization of the radiation is rotated, the TM radiation is absorbed by the aluminum electrode with the result that substantially all of the radiation in a particular electro-optic modulator is absorbed, and the light output at the end of that electro-optic modulator is essentially zero. In this manner, the line of radiation passing the plurality of electro-optic modulators may be selectively modulated by the selective application of voltages to the modulators. In an alternative embodiment, the spacing between the modulator may be doped with a material having a lower index of refraction than the material in the modulator. This would function to minimize optical crosstalk between adjacent modulators.

In the described embodiment all elements of each line of information are recorded in parallel, rather than in series as is common with mechanical recorders. The recorder may be easily interfaced with a computer by the use of a high-speed buffer. With such an interface, the computer would write out serially information to be recorded into the buffer which would then simultaneously apply the data to the plurality of electro-optic modulators.

In constructing the embodiment illustrated in FIGS. 1 and 2 the following considerations should be kept in mind. The index of refraction of the glass waveguide $n_g$ must be greater than the index of refraction of the glass substrate $n_s$ (which is greater than the index of refraction of air $n_a$). These conditions must prevail in order to have total internal reflection within the waveguide. Further, the index of refraction of the glass waveguide $n_g$ should match as closely as possible the index of refraction of the electro-optic waveguide material $n_z$ to minimize reflection losses.

Figure 3:
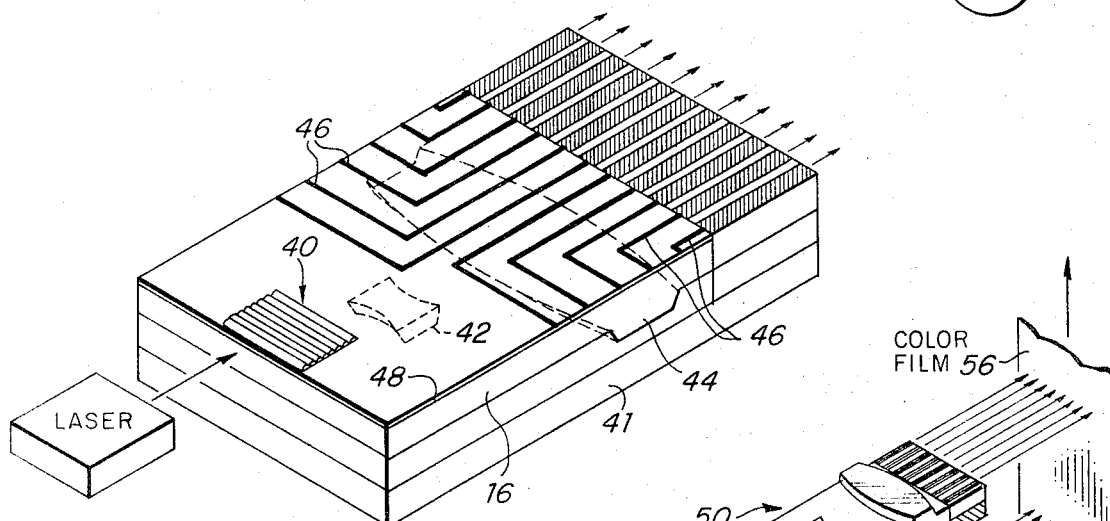
FIG. 3 illustrates a second and preferred embodiment of an integrated optics system for displaying and recording a line of information.

Referring to FIG. 3, there is illustrated the preferred embodiment of an integrated optics system for displaying and recording a line of information. The embodiment of FIG. 3 differs from the embodiment of FIGS. 1 and 2 in several respects. The laser beam is introduced into the waveguide by a grating coupler 40 on top of the waveguide which diffracts the laser beam into the waveguide. Diffraction coupling efficiencies of around 80 percent are achievable with the illustrated arrangement (in theory, the grating coupler can be fabricated to achieve 100 percent efficiency.) The laser beam would be directed at the diffraction grating at an optimum angle of incidence determined by the wavelength of the laser beam and the characteristics of the diffracting grating. The theory of diffraction coupling is discussed by M. Dakss, L. Kuhn, P. Heidreich and B. Scott, "Grating Coupler for Efficient Excitation of Optical Guided Waves in Thin Films," Appl. Phys. Lett. 13, 523 (1970). One advantage of the embodiment of FIG. 3 is that the laser beam is not focused at a point on the waveguide. This eliminates problems associated with the high power density of such a concentrated point of light. The embodiment of FIG. 3 has several other features different from the first embodiment. For ease of assembly, the entire recorder is constructed on a common insulating base 41 such as glass. Also, the diverging waveguide lens 42 and the collimating waveguide lens 44 are formed on the bottom of the waveguide rather than on the top of the waveguide. This feature allows the top of the waveguide to be utilized exclusively for electrical connections 46 for each of the electro-optic modulators. These connections 46 may be formed on the top of the waveguide utilizing integrated electronic circuit techniques. The embodiment of FIG. 3 allows the whole top surface of the waveguide to be utilized for such electrical connections. When considering that a recorder for 35 millimeter film might have 3,500 electrical connections, it is apparent that this is a very desirable feature. Depending upon the index of refraction of the electrical connecttors 46 and the material from which they are formed, it may be necessary to put an insulating layer 48 beneath the electrical connectors such that they do not interfere with the waveguide action of waveguide 16.

The embodiment illustrated in FIG. 3 might be constructed according to the following construction method:

1. On a substrate of glass or some other durable material deposit or cement the common electrode of the modulators onto this substrate.

2. Deposit the electro-optic material onto the common electrode.

3. Deposit glass of index $n_s$ onto the remaining portion of the large substrate until a thickness is achieved which is at the level of the bottom of the aspheric waveguide lenses (44).

4. Mask off the aspheric lens portions; deposit more glass of index $n_s$ until the level is identical to the bottom of the electro-optical waveguide.

5. Deposit glass of index $n_y$ until the level is identical to the top of the electro-optical waveguide.

6. Fabricate the grating coupler using photoresist techniques.

7. Diffuse lower index material into electro-optic material to form the multitude of individual channel-modulators, and evaporate aluminum electrodes onto each modulator.

8. Deposit the insulating layer onto the entire surface (except the grating coupler) so as to have maximum resonant absorption of TM radiation.

9. Deposit electrodes onto the channel-modulators and electrical leads to modulators using standard integrated electronic circuit techniques.

In another embodiment, not illustrated, the laser beam may be introduced into the waveguide by a prism-film coupler, as described by P. K. Tien, R. Ulrich, and R. J. Martin, "Modes of Propagating Light Waves in Thin Deposited Semiconductor Films," Appl. Phys. Lett. 14, 291 (1969).

Figure 4:
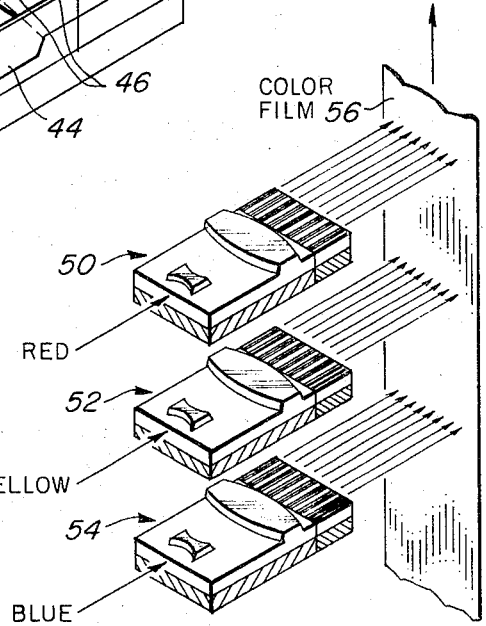
FIG. 4 illustrates a perspective view of a color, laser integrated optics recorder.

Referring to FIG. 4, there is illustrated a perspective view of a color, laser integrated optics recorder. The recorder includes three separate waveguides, 50, 52, and 54. Each of the waveguides is constructed in one of the manners previously illustrated, and the difference between them is that waveguide 50 is illuminated with a red laser beam, waveguide 52 is illuminated with a yellow laser beam, and waveguide 54 is illuminated with a blue laser beam. The three laser beams might originate from one common laser such as an argon-krypton laser. The three waveguides are positioned closely adjacent to each other, and a color film strip 56 is positioned adjacent to their outputs. The input video signals to the color recorder includes a red video signal, directed to waveguide 50, a yellow video signal, directed to waveguide 52, and a blue video signal, directed to waveguide 54. The outputs from the three waveguides are synchronized such that the line images formed by each of the three waveguides are combined in registration on the film to form a color image of the video signals transmitted to the waveguides.

Although the preferred embodiment has been illustrated as a laser beam recorder, it should be realized that the teachings of this invention may be utilized to form laser beam displays. Several waveguides, positioned adjacent to each other in a manner as illustrated in FIG. 4, may be utilized to display an optical image.

The preferred and illustrated embodiment of this invention utilizes the electro-optic modulators to change the phase of radiation in the waveguides to intensity modulate the radiation. In an alternative embodiment, the electro-optic modulators might be designed to phase modulate the wavefront to alter its shape at the terminal ends of the waveguides. Thus, instead of intensity modulating the radiation, the electro-optic modulators would function to produce a selected wavefront output by phase modulating the radiation. This embodiment might be utilized to achieve a direct analog of a phased-array scanner, wellknown in the field of microwave antennas. Using a combination cylindrical-spherical lens, the output wavefront would be brought to a spot focus. If the wavefront were undelayed at one side of the waveguide, and delayed progressively longer towards the other side of the waveguide, the spot of light would be scanned across the focal plane, much like a conventional mirror scanning system. Intensity modulation would be provided by a single separate modulator on the input side of the laser image recorder.

While several embodiments have been described, the teachings of this invention will suggest many other embodiments to those skilled in the art.

I claim:

1. A system for forming a line of modulated radiation data and comprising:
   a. a radiation waveguide means for guiding radiation therein, said waveguide means having a thickness and width at its output such that it forms a line of radiation across its width at its output;
   b. means for introducing radiation into said radiation waveguide means; and
   c. a plurality of electro-optic modulators spaced across the width of the output of said waveguide means for selectively modulating radiation in said waveguide means in accordance with electrical signals applied to each electro-optic modulator, whereby a line of modulated radiation data is produced at the output of said waveguide means.

2. A system as set forth in claim 1 and including means for directing substantially equal intensity radiation into each of said plurality of electro-optic modulators.

3. A system as set forth in claim 2 wherein said means for directing substantially equal intensity radiation includes a waveguide lens system.

4. A system as set forth in claim 3 wherein said waveguide lens system includes an aspheric diverging waveguide lens system for diverging the radiation in the waveguide means across the width of said waveguide means and an aspheric collimating waveguide lens system for collimating said diverging radiation to produce collimated, substantially equal intensity radiation across the width of said waveguide means.

5. A system as set forth in claim 1 wherein the system is utilized as a recorder and further including means for recording the line of modulated data at the output of said plurality of electro-optic modulators.

6. A system as set forth in claim 5 wherein said means for recording includes means for recording a plurality of lines of modulated data with each line of modulated data being recorded adjacent to another line of modulated data.

7. A system as set forth in claim 1 wherein said means for introducing radiation into said waveguide means includes a laser.

8. A system as set forth in claim 7 wherein said means for introducing radiation into said waveguide means includes a grating coupler means on the surface of said waveguide means.

9. Apparatus for forming a plurality of adjacent lines of modulated radiation data and including a plurality of adjacent systems as set forth in claim 1, each of which form a line of modulated radiation data.

10. Apparatus as set forth in claim 9 with each adjacent line of modulated radiation data being formed with a different color radiation, and wherein said means for introducing radiation in each adjacent system includes means for introducing a different color radiation into each of said plurality of adjacent systems.

11. A system as set forth in claim 1 and including means for applying electrical signals to said plurality of electro-optic modulators and comprising a plurality of electrical connections formed on one surface of said waveguide means in accordance with integrated electronic circuit techniques.

12. A system as set forth in claim 1 wherein each of said electro-optic modulators includes means for varying the phase of at least one component of the radiation passing therethrough.

13. A system as set forth in claim 12 and including means for directing substantially equal intensity radiation into each of said plurality of electro-optic modulators.

14. A system as set forth in claim 13 wherein said means for introducing radiation into said waveguide includes a laser.

15. A system as set forth in claim 14 wherein the system is utilized as a recorder and further including means for recording the line of modulated data at the output of said plurality of electro-optic modulators.

16. A system as set forth in claim 15 wherein said means for recording includes means for recording a plurality of lines of modulated data with each line of modulated data being recorded adjacent to another line of modulated data.

17. A system as set forth in claim 16 and including means for applying electrical signals to said plurality of electro-optic modulators and comprising a plurality of electrical connections formed on one surface of said waveguide means in accordance with integrated electronic circuit techniques.

18. Apparatus for forming a plurality of adjacent lines of modulated radiation data and including a plurality of adjacent systems as set forth in claim 17, each of which form a line of modulated radiation data.

* * * * *